H. K. FLAGLER.
Tube-Welding Mandrels.

No. 142,622. Patented September 9, 1873.

Witnesses
Saml. M. Barton
Edward F. Harnden

Inventor
Harry K. Flagler
by his atty.
Carroll D. Wright

UNITED STATES PATENT OFFICE.

HARVEY K. FLAGLER, OF BOSTON, MASSACHUSETTS, ASSIGNOR TO THE NATIONAL TUBE WORKS COMPANY, OF SAME PLACE.

IMPROVEMENT IN TUBE-WELDING MANDRELS.

Specification forming part of Letters Patent No. 142,622, dated September 9, 1873; application filed August 22, 1873.

*To all whom it may concern:*

Figure 1:
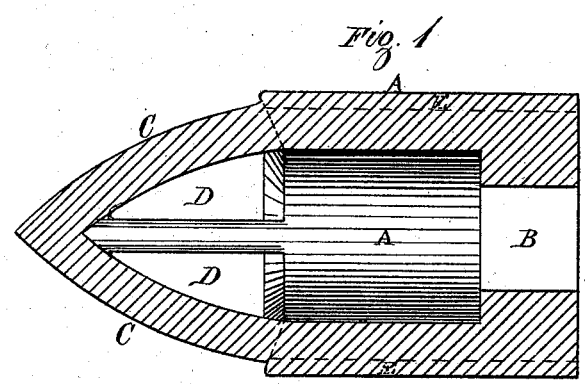
Figure 2:
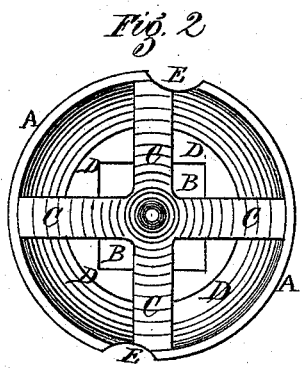

Be it known that I, HARVEY K. FLAGLER, of Boston, in the county of Suffolk and State of Massachusetts, have invented certain Improvements in Welding-Balls, of which the following is a specification:

Figure 1 of the accompanying drawing is a central vertical longitudinal section, and Fig. 2 is a front view of my improved welding ball or mandrel.

The present invention relates to certain new and useful improvements in so-called "welding balls" or mandrels, used in the manufacture of "lap-welded" tubing, pipes, and flues, &c. The object of these improvements is, principally, to lighten the weight of the metal and diminish the expense of the ball, to promote its durability, as well as to provide a means of obviating the objections heretofore caused by the gathering of dirt, slag, and other impurities of the iron, ahead of the ball in the process of welding the tubing, &c. My invention consists mainly in forming apertures of a triangular, or any desired shape, through the shell of the head of a "welding ball" or mandrel, and in forming longitudinal grooves in the outer periphery of the body of the ball or mandrel, so as to lighten the weight of the metal and allow the passage of the dirt, slag, and other impurities of the iron, to the interior and to the rear of the ball or mandrel, so as to prevent its sticking in the tubing or pipe, &c., all of which I will now proceed to more particularly describe.

In the drawings, A represents a welding ball or mandrel, formed at the rear with an aperture, B, for the reception of a bar, and having a tapering or conical head, C, through the shell of which head C are formed apertures D, of a triangular or any other desired shape. The exterior periphery of the body of the ball or mandrel is formed with longitudinal grooves E.

Ordinarily, when the tubing or pipe, &c., passes over the ball or mandrel in the process of welding, the dirt, slag, and other impurities of the tubing, &c., collect ahead of the ball and obstruct the ready passage of the tubing. But in my improvements the dirt, slag, &c., fall through the apertures D and collect within the ball, from which they are readily removed after the welding process, and are also carried along the grooves E to the rear of the ball, thus allowing the free passage of the tube.

By perforating the ball-head C, as above described, the ball is rendered more durable by not having to overcome the friction heretofore occasioned by the collection of the dirt, &c., ahead of it. Moreover, it is rendered less expensive by diminishing the weight of metal employed in its construction.

Having thus fully described my improvements, what I claim as my invention, and desire to secure by Letters Patent, is—

A welding ball or mandrel formed with longitudinal grooves E, and having its head perforated with triangular or other shaped apertures D, substantially as specified.

In testimony whereof I have signed my name to this specification in the presence of two subscribing witnesses.

HARVEY K. FLAGLER.

Witnesses:
CARROLL D. WRIGHT,
SAML. M. BARTON.